Nov. 10, 1953  H. W. KOST  2,658,248
COIL FORM FASTENER
Filed Feb. 8, 1952
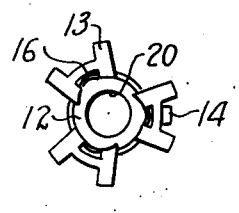
Fig. 1.
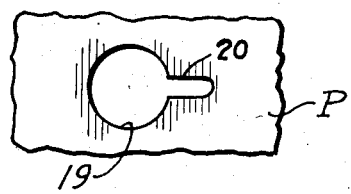
Fig. 2.
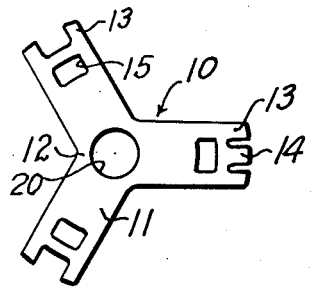
Fig. 3.
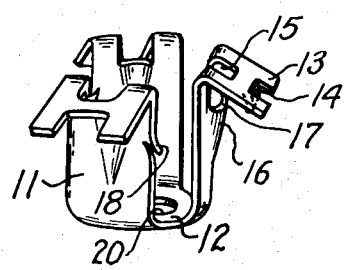
Fig. 4.
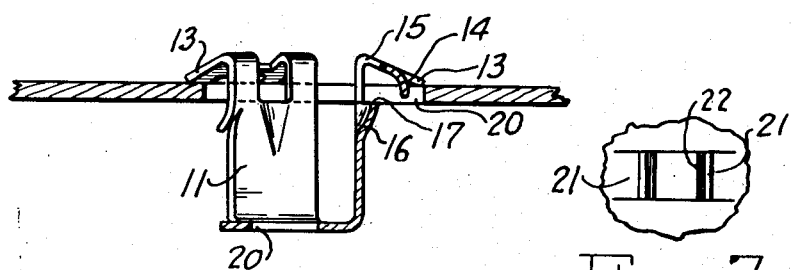
Fig. 5.
Fig. 7.
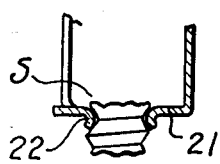
Fig. 6.
INVENTOR.
Harold W. Kost
BY
ATTORNEY Patented Nov. 10, 1953

2,658,248

UNITED STATES PATENT OFFICE 2,658,248

COIL FORM FASTENER

Harold W. Kost, Toledo, Ohio, assignor to Prestole Corporation, Toledo, Ohio, a corporation of Michigan Application February 8, 1952, Serial No. 270,571

1 Claim. (Cl. 24—73)

This invention relates to sheet metal fasteners but more particularly to a fastener for attaching coil tubes to a supporting panel and an object is to produce a fastener of this character, which can be readily attached to apertured panels of varied thicknesses, is firmly retained in position, and is adapted positively to hold the form or tube against unwarranted separation from the supporting panel.

Another object is to produce a coil tube fastener, which can be readily and economically produced from stamping operations on a quantity basis and which can be applied in position of use without requiring special tools or equipment.

Other objects reside in details of construction, arrangement and assembly and, for purposes of illustration but not of limitation, embodiments of the invention are shown in the accompanying drawings in which—

Figure 1 is a bottom plan view of a coil tube fastener;

Figure 2 is a fragmentary view of a panel apertured to receive the fastener;

Figure 3 is a plan view of the blank from which the fastener shown in Figure 1, is formed;

Figure 4 is an enlarged top perspective of the coil tube fastener shown in Figures 1 and 3;

Figure 5 is a vertical sectional view on an enlarged scale of the fastener applied to a supporting panel;

Figure 6 is a fragmentary vertical sectional view of an alternate form adapted threadedly to receive a screw; and Figure 7 is a bottom plan view of the fastener shown in Figure 6.

The illustrated embodiment of the invention shown on Figures 1 to 5 comprises a relatively thin gauge resilient sheet metal fastener formed from a blank 10 having three equidistantly spaced radially extending arms 11, which are integrally connected at their adjacent ends to a bottom wall 12. A cut out is formed in the free ends of two of the arms to provide a pair of fingers 13. In the free end of the other arm, slots are formed to provide similar fingers 13 and a central finger 14, and spaced inwardly from the fingers 13 in each arm is a cut out 15.

In forming the fastener, the arms 11 are bent upwardly at right angles to the bottom wall 12 and formed arcuate in cross section, as shown in Figure 4. The end portion of each arm is bent in the region of the respective cut out 15 to a position inclining downwardly toward the bottom wall and outwardly away from fastener for a purpose hereinafter described. The finger 14 is bent downwardly to lie in a place approximately parallel to the arms 11. The metal in the region of and below the lower edges of each cut out 15 is pressed outwardly to form flared protrusions 16, the upper edges 17 of which form ledges to cooperate with the fingers 13 to retain the fastener in position as will hereinafter appear.

As shown in Figures 4 and 5, about midway of one side of each arm 11 is a downwardly and inwardly inclined prong or barb 18, which impinges or bites into a coil tube disposed within the fastener. These prongs 18 militate against the coil tube coming loose, thereby retaining it positively in position against upward movement as well as rotary movement in one direction. It will appear, however, that a coil form may be readily inserted in the fastener whether the latter has or has not been applied to the supporting panel.

In use the fastener is applied to a panel P, which is formed with a hole 19 having a diameter slightly greater than that of the fastener. Extending from one side of the hole 19 is a slot 20 into which extends the downturned finger 14 for holding the fastener against turning movement. The fastener is, of course, inserted into the hole 19 until the fingers 13 engage the upper surface of the panel P, the flared protrusions 16 riding over the edge of the hole 19 and slightly camming the arms 11 inwardly until the ledges 17 engage the underside of the panel. Thus the spring action of the fingers 13 and downwardly extending portions of the arms 11 cooperate with the ledges 17 to grip the opposite sides of the panel and hold the fastener in place, the resiliency of the structure enabling it automatically to accommodate itself to varying panel thicknesses In the form shown on Figures 1, 3, 4 and 5, the bottom wall 12 has an opening 20 through which an extension of the coil tube may project. However, in the form shown in Figures 6 and 7 a pair of tongues 21 are struck from the bottom wall and the free ends of those tongues have downwardly curved terminals 22 frictionally to engage a screw S forced therebetween.

The above fastener is particularly useful in the mounting of small tubes such as are comprised in radio frequency chokes, transformers and the like usually mounted upon the chassis of radio, television and other electronic equipment. It is apparent that this fastener can be easily applied and is effective in resisting vibration and other forces which might loosen it. Its simplicity lends itself to inexpensive manufacturing operations and the structure is such as efficiently and reliably to retain the coil form in place and the fastener secure to its panel.

It is to be understood that changes in details of construction and arrangement may be effected without departing from the invention as defined in the following claim.

What I claim is:

A coil tube fastener comprising one piece resilient sheet metal structure having a bottom wall, arms arcuate in cross section extending upwardly from said bottom wall, downwardly and outwardly inclined terminals on said arms, flexible finger means on the free ends of said terminals, prongs on each arm for retaining a coil tube within the structure, there being a slot in each terminal in the region of its juncture with the respective arm, said slot extending along each arm and ending in a transverse edge portion, an outwardly extending rib-like protrusion on each arm with said transverse edge portion bowed outwardly and providing the upper end thereof, each transverse edge portion being arranged approximately in the plane of the lower end of the respective terminal when the latter is unflexed, the outer wall of said protrusion inclining gradually downwardly and inwardly toward said bottom wall to form a relatively rigid cam surface, whereby when the structure is inserted into a panel aperture the cams cause the arms to flex inwardly toward each other until the transverse edge portions engage the underside of the panel with the terminals resiliently engaging the upper side of the panel.

HAROLD W. KOST.

References Cited in the file of this patent

UNITED STATES PATENTS

| Number | Name | Date |
|---|---|---|
| 1,400,155 | Greenburg | Dec. 13, 1921 |
| 1,935,312 | Cook | Nov. 14, 1933 |
| 2,245,375 | Wiley | June 10, 1941 |
| 2,360,647 | Churchill | Oct. 17, 1944 |
| 2,567,884 | Heath | Sept. 11, 1951 |